3,541,027
USING ADDED AMMONIA DURING DEAMMONIATION TO CRACKING CATALYST CONTAINING HYDROGEN FAUJASITE
Jules S. Lapides, Broomall, Pa., assignor to Air Products and Chemicals, Inc., Philadelphia, Pa., a corporation of Delaware
No Drawing. Filed Aug. 8, 1968, Ser. No. 751,021
Int. Cl. B01j *11/40*
U.S. Cl. 252—455        4 Claims

ABSTRACT OF THE DISCLOSURE

Particles comprising ammonium faujasite in an aluminosilicate matrix are transformed into cracking catalysts by heating the particles in the presence of a gas comprising at least 5% but less than 95% added ammonia and at least 5% but less than 95% added steam. The added gases are introduced for their modifying effect and are to be distinguished from the relatively small amounts of gases evolved during deammoniation of the precursor. The hydrogen faujasite resulting from such heat treatment is of a type which has remarkable stability, that is, it is resistant to deactivation in hot steam. Thus, after accelerated aging in hot steam, the cracking catalyst is more stable, more selective and/or more active than comparable catalysts prepared in the absence of added ammonia during the deammoniation of the precursor. Ammonia recovery, enhanced attrition-resistance, and other advantages are also available through the use of added ammonia and steam in the final stages of manufacture of the cracking catalyst particles.

BACKGROUND OF THE INVENTION

Any ammonium zeolite, amorphous or crystalline, including ammonium faujasite, can be carefully heated to evolve ammonia and to form a product comprising hydrogen zeolite. Heating of a product comprising moisture-containing ammonium zeolite causes the evolution of both steam and ammonia and the formation of a mixture comprising hydrogen zeolite and decationized zeolite. When any decationized zeolite is formed, then the ion-exchange capacity of the mixture is less than the ion-exchange capacity of the ammonium zeolite precursor from which it was formed. Such loss of ion-exchange capacity and decationization are equivalent expressions for an identical phenomena. Some technologists have distinguished between the temporary and reversible decationization at milder conditions (e.g. vacuum, dry gas stream, and/or moderate temperatures, etc.) and permanent and irreversible decationization at relatively severe conditions (e.g., steam and/or elevated temperatures). Some forms of crystalline ammonium zeolites are converted to crystalline hydrogen zeolite (comprising some crystalline decationized zeolite) having such small pores as to permit cracking of only normal paraffins. The superiority of heat-treated crystalline hydrogen zeolites over amorphous refractory oxides as catalysts or catalyst supports, except as limited by diffusion limitations, had long been recognized.

The revolutionary discovery disclosed in Milton and Breck 2,988,503 and Belgian 534,193 (1955) that the pores of faujasite permitted diffusion of alkyl aromatic compounds completely transformed the history of catalytic cracking, pointing the way toward a hydrogen zeolite having pores accommodating gas oil vapor and having the long-recognized advantages of crystalline catalyst supports. Crystalline hydrogen faujasite can be prepared by thermal treatment of the ammonium faujasite taught by Milton 2,882,244 (Belgian 534,425 of 1955 and French 1,117,756 of 1956), such thermal treatment involving the exactly analogous transformation involved in the manufacture of amorphous hydrogen zeolite cracking catalysts from amorphous ammonium zeolite precursors during earlier decades. Substantially any hydrogen faujasite can retain its crystallinity at the lower portion of the catalytic cracking temperature range. However, some forms of hydrogen faujasite are transformed into amorphous aluminosilicate in the presence of steam at the upper range of conventional regeneration temperatures encountered in the customary catalytic cracking cycle. The petroleum refinery industry adapted to such potential instability of the hydrogen faujasite, not by increasing the capital investment in regeneration equipment to permit regeneration at temperatures appropriate for the hydrogen faujasite of Milton 2,882,244, but by modifying the cracking catalyst to impart reasonably sufficient stability to the faujasite component that it could withstand the effects of the steam concentrations and thermal conditions of conventional regeneration zones.

The thermal stability of much of the commercial fluid cracking catalyst can be attributed to the presence of relatively costly rare earth faujasite catalyst. As exemplified by Bond et al. 2,449,050, cracking technologists had long been aware that rare earth cations enhanced the performance of cracking catalysts, but in view of the cheapness of conventional cracking catalyst, the prevailing customs concerning tolerance of catalyst consumption, and the high cost of rare earth salts, the technical superiority of amorphous rare earth-containing zeolites has limited economic justification as substitutes for amorphous zeolitic cracking catalysts. Rare earth cations did have economic justification for faujasite cracking catalysts, not primarily for their enhancement of initial activity, but primarily because rare earth faujasites could withstand the steam and elevated temperatures of conventional regeneration zones with greater stability than hydrogen faujasites of relatively low silica to alumina ratios. Complete X-ray diffraction data for rare earth faujasite, as well as much sorption data, are set forth in Milton 2,882,244. Rare earth faujasite possesses better thermal stability than hydrogen faujasite. The thermal stability of any faujasite, and particularly any hydrogen faujasite, is dependent in part on how high is the silica to alumina unit mol ratio. Such silica to alumina unit mol ratio is dependent upon the silica to alumina unit mol ratio of the alkali faujasite from which it is derived, and ion exchange or other modification does not alter such unit mol ratio. Natural faujasite, having a silica to alumina unit mol ratio of about 5 has advantageous thermal stability. It is relatively difficult to synthesize sodium faujasite having a silica to alumina ratio as high as that in natural faujasite.

The runs for synthesizing sodium faujasite described in Milton 2,882,244 provided faujasites having a silica to alumina unit mol ratio (completely arbitrary concept when applied to the crystal lattice of faujasite) from about 2.4 to about 3.5, but the claims were directed only to unit mol ratios below 3.0.

Hydrogen faujasite having a silica to alumina unit ratio above about 4 also had commercially acceptable stability. Granular cracking catalyst manufactured by a procedure resembling Example 6 of Haden et al. 3,367,886 rapidly captured a significant portion of the granular faujasite cracking catalyst market purchased by refiners from independent catalyst manufacturers. For many years, the petroleum industry was aware of the pattern of the achievement of acceptable stability for hydrogen faujasite for granular catalyst by adequately high silica to alumina ratios, and the dependence of fluidizable catalyst manufacturers upon rare earth faujasites for attaining tolerable stability.

Heretofore granular cracking catalysts have been prepared by the thermal deammoniation of precursor particles comprising ammonium faujasite in an aluminosilicate matrix. It has been standard practice to employ a controlled amount of steam in the thermal treatment zone and to heat the granular particles as rapidly as feasible. In previous manufacture of pellets consisting of hydrogen faujasite in an aluminosilicate matrix, the hot gas flow has been counter-current to the gravitating bed of particles being treated. Hence, the ammonia evolved by the decomposition of the ammonium faujasite has passed through the particles at a cooler temperature, but did not significantly alter the composition of the atmosphere in which the particles were subjected to temperatures promoting ammonia evolution.

During several years it has been the standard practice, in manufacture of much of the fluidized faujasite catalyst employed industrially, to ship dried-only particles comprising ammonium faujasite resulting from ion-exchange. At the petroleum refinery such particles, when introduced into the regenerator as make-up catalyst, were suddenly exposed to an atmosphere comprising combustion gases and hot steam and thus instantly deammoniated.

SUMMARY OF THE INVENTION

In accordance with the present invention, cracking catalyst particles of either granular or fluidizable size, said particles having an advantageous steam and thermal stability, are prepared by the treatment of ammonium faujasite-containing particles to effect deammoniation of at least part of the ammonium faujasite at an elevated temperature above about 260° C. and in an atmosphere containing a significant amount of added basic gas, preferably added ammonia, as well as a significant amount of added steam. Neutral gas such as air, although advantageously and preferably absent, may be present in amounts up to 90% by volume of the added gases. Alkyl ammonium compounds, sometimes called aliphatic amines, such as trimethyl amine or ethylene diamine, can provide the desired basic gas, and may be substituted for all or a portion of the ammonia when cost factors permit. When the basic gas evolved from such treatment is recovered for reuse instead of following the conventional practice of venting the gas to the atmosphere, important economic advantages are achieved. By reason of the combination of such special heat treatment with the added steam and the added ammonia, the particles develop a structural stability at the catalyst factory such that subsequent treatment and/or use of the particles in the refinery brings about less loss of selectivity and/or activity than otherwise would occur. Thus, deammoniation of faujasite-containing catalyst in the presence of added ammonia and steam imparts superior stability to the catalyst so that the catalyst withstands carbon dioxide, elevated temperatures, and/or steam intermittently more satisfactorily than conventionally prepared faujasite-containing catalyst. In providing such deammoniation treatment for fluidizable catalyst, the present invention provides an additional step which has not been commercial practice for faujasite-containing fluidizable catalyst heretofore. Because of the propensity of engineers in charge of manufacturing ruthlessly to eliminate any step not adequately justified by its utility, practice of the present invention on an industrial scale is persuasive evidence of its outstanding value. Thus, this is an added step to be distinguished from a modified step which might be adopted industrially for economic reasons instead of because of the superiority of the product.

GENERAL NATURE OF METHOD

In the manufacture of cracking catalysts comprising faujasite, the ammonium form of precursor can be prepared in any of a variety of procedures. Haden et al. 3,367,887, Example I, describes the preparation of pellets containing ammonium faujasite in an aluminosilicate matrix, the sodium oxide content being from about 0.44 to about 0.78% of the dehydrated pellet weight. Said patent explains that most zeolite-containing catalysts tend to lose activity and/or selectivity when subjected to an accelerated aging test by steaming at temperatures above the peak temperature employed in catalyst production. The resistance to deactivation by accelerated aging in steam at selected temperatures is designated as thermal stability. Although the temperature at which a catalyst exhibits instability in steam is lower than the temperature of instability in air and although in previous decades there was a tendency to exploit hot air tests, modern trends have been toward treating tests in the presence of steam as the only relevant evaluation of thermal stability. Many factors, including composition, processing history, particle size, nature of matrix, and other variables affect the thermal stability of faujasite-containing cracking catalysts.

Small differences in the sodium oxide concentrations of similar catalysts apparently can cause significant differences in thermal stability of catalyst samples, as shown in FIG. 1 of 3,367,887. Other small differences in chemical composition affect the ultimate stability.

It should be noted that the thermal stability of a cracking catalyst is dependent not merely upon composition, but also upon its total history. Differences in the matrix, or differences in manufacturing procedures, or differences in the starting materials from which the faujasite was prepared affect the ultimate stability.

The discovery that a diluted faujasite catalyst could achieve greater thermal stability by ammoniacal deammoniation was quite surprising. For reasons not clearly understood, cracking catalysts comprising faujasite are significantly less stable when deammoniated in the absence of added ammonia. Of particular importance is the discovery of the present invention that the presence of from about 5% to about 95% added ammonia in the atmosphere combined with the presence of at least 5% steam during at least a portion of the pretreatment at a temperature at which the deammoniation is effected, e.g., above about 260° C., but no higher than a temperature at which the beneficial effect is adversely affected, enhances the thermal stability of a cracking catalyst featuring hydrogen faujasite in an amorphous aluminosilicate matrix. In accordance with certain embodiments of the invention, the precursor is subjected to heat treatment in the appropriate atmosphere at temperature conditions to effect substantially complete deammoniation of the ammonium faujasite.

The appropriate concentration of added ammonia in the atmosphere for the pretreatment of the particles is likely to depend in some measure upon the apparatus employed, the recovery system, and the other variables. Investigations have indicated that concentration ranges from about 10% to 30% ammonia or basic gas are especially suitable. A series of tests has established that the range from 5% to 95% ammonia is operable. The minimum concentration of steam is 5% and the maximum steam concentration is 95%. A larger mole concentration (or volume concentration) of steam than ammonia has been tested often, but $NH_3/H_2O$ ratios up to about 19 are operable. Neutral gases (e.g., air) may constitute from zero to about 90% of the volume of the gas added to the treatment zone. The interaction of added ammonia and steam on the precursor undergoing deammoniation (deemed to be a mixture of ammonium faujasite and hydrogen faujasite) is believed to account for the development of a hydrogen faujasite structure having enhanced thermal stability.

Further clarification of the invention is set forth in a plurality of examples, certain standard procedures being followed in all examples.

Catalyst particles of the fluidizable size range were prepared by: alkaline aging of calcined kaolin to prepare sodium faujasite in an aluminosilicate matrix; preparation of an aqueous system containing suspended finely divided particles of sodium faujasite in an aluminosilicate matrix; admixture of sodium silicate solution with such aqueous system; spray drying; and removal of a substantial portion of the contained sodium by ion-exchange treatment of these spray dried particles with aqueous solutions of appropriate ammonium or ammonium-type salts, such as for instance ammonium nitrate. Inasmuch as the present invention is concerned primarily with steps subsequent to treatment of the particles containing sodium faujasite with a solution of an ammonium compound for ion-exchange, any of many routes can lead to the ammonium faujasite-containing particles. Throughout the examples, the ammonium faujasite-containing particles were prepared by a procedure described in Ser. No. 628,518, filed Apr. 5, 1967 by W. H. Flank et al. for "Faujasite in Matrix Particles," (assigned to Air Products and Chemicals, Inc.).

For many years, it has been standard practice to conduct certain evaluation of fluidizable catalyst using fixed beds of pelleted aggregates of the fluidizable particles. Dried-only ammonium faujasite precursors were aggregated in a Stokes Pelleting Machine to produce wafers (sometimes called pellets), at least 70% of which could withstand a 3 pound knife edge hardness test. Such wafers of ammonium faujasite-containing particles were used in the series of hereinafter described evaluations of fluidizable catalyst by the standard wafer testing procedures. Said pelleted aggregates of fluidizable cracking catalyst particles were evaluated to determine the effect of various pretreatments and to measure the significant differences in the thermal stability of the cracking catalyst after an accelerated aging treatment for four hours in 100% steam at various temperatures as high as 845° C. (1553° F.).

The same procedure was followed for preparing the precursors for each of controls and examples, and the different batches of fluidized catalyst were known to be sufficiently uniform to meet marketing requirements. If the precursor was subjected to a pretreatment, a cracking catalyst comprising hydrogen faujasite in an aluminosilicate matrix was formed, but its initial activity was ordinarily not noted. All such catalysts met commercial standards for a faujasite-containing catalyst. The project with which the present invention was concerned was activity after accelerated aging as distinguished from initial activity. Accelerated aging treatments at temperatures above about 800° C. for at least an hour in an atmosphere comprising steam were standard features of the program. The aged (i.e., artificially aged by hot steam) catalyst was evaluated by the CAT–D–1 procedure described by C. G. Harriz in the October 1966 issue of "Hydrocarbon Processing." Such procedure was intended to evaluate the relationship between the thermal stability (reflected by activity subsequent to artificial aging) and pretreatment.

EXAMPLE I

Precursor particles were given no pretreatment of the type within the scope of the present invention. The precursor particles containing ammonium faujasite were initially subjected to steam at 845° C. to provide an aged catalyst containing 3% faujasite, 27 m.²/g. surface area; and this was designated as Control A. Said Control A permitted preparation of 30.5 volume percent gasoline at 32.3% conversion.

For Example I, precursor particles containing ammonium faujasite, said particles being identical to those employed as the starting precursor for Control A, were treated for two hours at 540° C. in a mixture of 10% added ammonium and 90% added steam. The ammonia evolved by such heat treatment was relatively small, so that only the added ammosia was significant. Thereafter the catalyst was subjected to an accelerated aging treatment for 4 hours in 100% steam at 845° C. The X-ray diffraction study of the catalyst after 845° C. treatment showed the presence of 6.7% faujasite. The surface area of the aged catalyst was 47 m.²/g. Said catalyst promoted the conversion of 46.3% of the gas oil and production of 43.5% by volume of gasoline, and hence was about 50% better than the control.

EXAMPLES II–III

Several samples of the same precursor employed in Control A and Example I were employed for pretreatments for two hours in atmospheres containing both steam and added ammonia. Several tests were conducted using a mixture of 10% added ammonia and 90% added steam, but such frequent use of the same mixture is not a limitation on the scope of the invention. Similarly, the frequency of use of the 540° C. treatment permitted more convenient interpretation of the results without limiting the scope of the invention.

In Example II, the combination of 90% steam, 10% ammonia was used, but the pretreatment temperature was 760° C. The 540° C. pretreatment temperature was employed in Example III, featuring added ammonia amounting to 30% of the volume of the pretreatment atmosphere. After accelerated aging for 4 hours in 100% steam at 845° C., the two catalysts had about the same surface area of 36 m.²/g. The aged Example II catalyst contained 5% faujasite and catalyzed the formation of 34.2 volume percent gasoline at 37.4% conversion. The aged Example III catalyst contained 6.3% faujasite and provided 38.1% conversion and 35.4 volume percent gasoline.

EXAMPLE IV

A different fluidizable catalyst comprising ammonium faujasite in an amorphous silica-alumina matrix was employed for Control B. The Control B was heated to 845° C. in 100% steam and maintained at that temperature for 4 hours for an accelerated aging test. The thus aged product contained 3% faujasite, had a surface area of 29 m.²/g. and was effective for the conversion of 29.8% gas oil to produce gasoline constituting 27.3% of the volume of the gas oil feed.

For Example IV, the precursor particles containing ammonium faujasite were the same as the precursor particles for Control B. The particles comprising a minor amount of ammonium faujasite were pretreated for 2 hours at 540° C. in a mixture of 30% added ammonia and 70% by volume steam. The thus pretreated catalyst was heated to 845° C. in 100% steam for 4 hours to provide an artifiically aged product having 6% faujasite, a surface area of 35 m.²/g. and effective for the conversion of 33.7% of the gas oil to produce 32.7 volume percent gasoline, thus being superior to Control B.

For the purpose of investigating the appropriateness of 100% ammonia in the atmosphere for the preheat, the same precursor as employed in Control B was heated for 2 hours at 540° C. in 100% added ammonia to provide a sample C. The quantities of ammonia and steam generated by the heating of ammonium faujasite were relatively small compared to the quantities of added ammonia. The effect of this treatment was to decrease the thermal stability of C inasmuch as after treatment in 100% steam at 845° C., the faujasite content was only 1.0% and the surface area was reduced to 24 m.²/g. As a cracking catalyst, the 845° C. treated material permitted the conversion of 19.5% of the gas oil to obtain 19.7 volume percent gasoline, thus being inferior to Example IV.

By a series of tests, it was established that the concentration of added ammonia should be within the range from about 5% to about 95%, desirably 10% to 30%, that the concentration of added steam should be within the range from about 5% to about 95%, desirably 70% to 95%, and the volume unit ratio of $H_2O/NH_3$ should be from about 1 to about 19. Neutral gases such as air can be present with due consideration to possible increase in preheat time and/or temperature to overcome possible diluent effects. Usually it is advantageous to control the neutral gas content of the added gas at 0%, but it may be up to 90% by volume of the added gas. Aliphatic amines such as trimethyl amine may be substituted on a mol for mol basis for the ammonia, particularly when the basic gas is recovered instead of being vented to the atmosphere.

EXAMPLE V

A sample of cracking catalyst precursor comprising ammonium faujasite in an amorphous matrix derived from sodium silicate and calcined kaolin was heated in steam for 7 hours at a series of temperatures including 400, 450, 550, 600 and 680° C., the catalyst being maintained at about each temperature for an hour, thereby providing an active cracking catalyst. Gradual heating requiring a plurality of hours to reach peak temperature is designated as multistaged heating. This catalyst, designated as Control D, was subjected to a standard accelerated aging treatment consisting of treatment in steam at 815° C. for 4 hours. The aged particles then contained 7% faujasite, and were effective in converting 63% of the gas oil for the production of 54.8 volume percent gasoline.

Using the same precursor as for Control D, particles containing ammonium faujasite were heated at the same series of temperatures, in the presence of an added mixture of 10% added ammonia and 90% added stream. Similarly, the treatment at 815° C. was also conducted in a mixture containing by volume 10% added ammonia and 90% added steam. The catalyst was found to contain 10.7% faujasite, and to bring about the conversion of 66.9% of the gas oil to provide 59.5% by volume gasoline in the standard CAT-D test. Thus, the catalyst which had been ammoniatively deammoniated was better than Control D. Such evaluation indicated that ammonia in the deammoniated step enhanced the thermal stability of the cracking catalyst. This evaluation also indicated that although the deammoniation is substantially complete at temperature below about 590° C., as shown in other tests, the presence of ammonia at higher temperature while offering no particular advantages is not detrimental to the enhanced thermal stability resulting from the ammoniative deammoniation in accordance with the invention.

EXAMPLE VI

Pellets of a precursor comprising ammonium faujasite in an aluminosilicate matrix are subjected to a series of increasing temperatures while maintaining an atmosphere of about 15% ammonia, 30% steam, and 55% air in the heat treatment zone. The pellets of the thus calcined cracking catalyst have attractive properties as a cracking catalyst, and show advantageous stability while providing outstanding conversion and selectivity. When subjected to an accelerated aging test at 845° C., the cracking catalyst undergoes some deactivation but significantly less deactivation than for a control prepared from the same ammonium faujasite precursor by preliminary heating in air instead of the mixture of air, ammonia and steam.

EXAMPLE VII

Pelleted precursor comprising sodium faujasite in an aluminosilicate matrix is prepared and ion-exchanged with aqueous trimethyl amine nitrate to provide the trimethyl amine form of faujasite. This is ion-exchanged to introduce metal in ion-exchange positions to account for about one-third of the ion-exchange capacity of the trimethyl amine faujasite. Any of a plurality of metallic cations can be employed for such ion-exchange step, some of the possibilities including cerium, magnesium, rare earth, and/or aluminum cations. The anion of an ion-exchange solution is desirably nitrate but may be formate, acetate, carbonate, chlorate, or a mixture of anions. The partially metal-exchanged precursor is converted into a cracking catalyst by conducting the thermal deammoniation in a mixture of about 90% by volume steam containing about 10% added trimethyl amine, thereby enhancing the thermal stability of the catalyst. Ammonia and trimethyl amine are recovered for reuse.

EXAMPLE VIII

A batch of fluidizable ammonium faujasite catalyst was prepared and found to contain 30.3% faujasite having a ratio of 4.77 silica to alumina and to contain 1.31% sodium oxide on an ignition basis. The base-exchange capacity of the material was 1.70 milliequivalents per gram.

Two samples of the ammonium faujasite fluidizable catalyst were compression molded into wafers and subjected to deammoniation, accelerated aging, and CAT-D-1 evaluation to obtain the data of Table 1. The only significant difference between the two samples was in the atmosphere during deammoniation by gradually heating up to the peak temperature (540° C.) during several hours. For Control E, the atmosphere was 100% steam, but in Example VIII was a mixture of 90% steam and 10% added ammonia. As in each of the other staged heatups, more than an hour was required to attain 400° C. and more than an hour was required for increasing the particle temperature from 400° C. to a peak temperature below 800° C. Normally, a peak of about 540° C. was suitable.

TABLE 1

| | Control E | Example VIII | Percent improvement |
|---|---|---|---|
| Vol. percent gasoline | 57.3 | 61.6 | 8 |
| Wt. percent coke | 1.4 | 1.5 | |
| Wt. percent gas | 10.0 | 13.5 | |
| Gas gravity | 1.50 | 1.56 | |
| Wt. percent conversion | 59.7 | 67.1 | 12.2 |
| M²./g. surface area | 62 | 69 | 11 |
| Wt. percent faujasite | 6.7 | 7.3 | 9 |

The attainment of 67.1% conversion after the standard accelerated aging treatment at 815° C. was not only 12.2% improvement over the control, but better than is ordinarily attainable with an amorphous cracking catalyst after aging at 815° C.

EXAMPLE IX

Two portions of a fluidizable ammonium faujasite in a silica-alumina matrix were subjected to deammoniation, then to an accelerated aging in steam at 815° C., and then to evaluation as a cracking catalyst. Pretreatment of Control F was by slow heating of the particles in 100% steam. Pretreatment of Example IV was by slow heating of the particles in an atmosphere consisting essentially of 70% added steam and 30% added ammonia plus the steam and ammonia evolved from the precursor. Data relating to the superiority of the Example IX catalyst over the Control F are shown in Table 2.

TABLE 2

| | Control F | Example IX | Percent improvement |
|---|---|---|---|
| Vol. percent gasoline | 57.8 | 61.5 | 6.5 |
| Wt. percent coke | 1.8 | 1.7 | |
| Wt. percent gas | 14.2 | 15.5 | |
| Gas gravity | 1.40 | 1.39 | |
| Wt. percent conversion | 64.8 | 69.3 | 8 |
| Wt. percent selecitivity | 75.3 | 75.2 | |
| M²./g. surface area | 93 | 106 | 14 |
| Wt. percent faujasite | 6.3 | 10.1 | 59 |

The only significant difference between the methods of preparation for the samples was the composition of the atmosphere during deammoniation by gradually heating the sample toward the peak temperature of about 540° C. Only steam was used in preparing Control F. A mixture of 70% steam and 30% ammonia was employed for Example IX. The superior performance of the catalyst can be attributed primarily to the presence of added ammonia and steam during deammoniation.

Previous catalyst manufacturing plants and refineries using conventional ammonium exchanged fluidizable catalyst have vented many tons of ammonia into the atmosphere because the capital investment required for recovering the very small amount of ammonia in the effluent gas was not obviously outstandingly profitable. The rising expectations of regulatory bodies governing air pollution point toward an era when such ammonia venting will be discouraged. Facilities for recovery of amines and/or ammonia involve capital investments which are larger as the catalyst tonnage capacities are larger. A surprising feature of the present invention is that the larger concentration of the basic gas in the stream subjected to recovery permits recovery of the basic gas at a cost per ton which is significantly less than previously estimated for factories using conventional steam deammoniation of catalyst particles.

Attention is called to the fact that thermal damage to the stability of the catalyst is attributable at least in part to temperature above 590° C. (1100° F.), particularly in the presence of steam, such as may occur in regeneration units of a catalytic refinery. However, when the particles containing ammonium faujasite in an aluminosilicate matrix are ammoniatively deammoniated in accordance with the method of the invention in the temperature range of about 260° C. to about 590° C., the tendency toward thermal damage is substantially lessened, even when heated to a deammoniation temperature quite rapidly. Thus, in the ammonia-steam atmosphere as herein defined the precursor particles can be pretreated as a fluidized bed maintained at about 480° C., and product withdrawn to maintain an average residence time of about 5 minutes; and the stream sent for five minutes as a second fluidized bed maintained at about 580° C. Such ammoniative deammoniation of the precursor particles has been found to be the significant factor responsible for long-term stability in steam at much higher temperatures and earlier interpretations of the significance of the rate of heating have been considered of less importance. Thus a variety of ways are available for effecting the required heating of the particles to obtain the deammoniation in the presence of the basic gas and the steam. Naturally, normal care will be practiced in accordance with sound operating principles, such as for instance where ultimate hardness of the particle is important excess moisture would be removed prior to shock heating, e.g., plunging the particles in to a high temperature environment. In general, staged heating and modified forms thereof are satisfactory. Such deammoniation should be completed at a temperature below about 590° C. and in the presence of the stated amounts of basic gas and steam. The atmosphere in which the particles are deammoniated may contain some ammonia evolved from the faujasite in addition to the much larger amount of added basic gas.

Further understanding of selected features of the foregoing examples can be gained from a study of Table 3.

TABLE 3

| Sample | Pretreatment | | Accelerated aging, °C. | After accelerated aging | | | |
|---|---|---|---|---|---|---|---|
| | | | | Properties | | Cat. D. performance | |
| | Percent, H₂O | Percent, NH₃ | °C. | | Wt. percent, faujasite | M²./g. surface area | Vol. percent, gasoline | Wt. percent, conv. |
| 1 | 90 | 10 | 540 | 845 | 6.7 | 47 | 34.5 | 46.3 |
| Control A | (¹) | (¹) | (¹) | 845 | 3.0 | 27 | 30.5 | 32.2 |
| 2 | 90 | 10 | 760 | 845 | 5.0 | 36 | 34.2 | 37.4 |
| 3 | 70 | 30 | 540 | 845 | 6.3 | 37 | 35.4 | 38.1 |
| 4 | 70 | 30 | 540 | 845 | 6.0 | 35 | 32.7 | 33.7 |
| Control B | (¹) | (¹) | (¹) | 845 | 3.0 | 29 | 27.3 | 29.8 |
| Control C | (¹) | 100 | 540 | 845 | 1.0 | 24 | 19.7 | 19.5 |
| 5 | 90 | 10 | 670 | 815 | 10.7 | | 59.5 | 66.9 |
| Control D | 100 | (¹) | 670 | 815 | 7.0 | | 54.8 | 63.0 |
| 8 | 90 | 10 | 540 | 815 | 7.3 | 69 | 61.6 | 67.1 |
| Control E | 100 | (¹) | 540 | 815 | 6.7 | 62 | 57.3 | 59.7 |
| 9 | 70 | 30 | 540 | 815 | 10.0 | 106 | 61.5 | 69.3 |
| Control F | 100 | (¹) | 540 | 815 | 6.3 | 93 | 57.8 | 64.3 |

¹ None.

EXAMPLE X

A different batch of precursor particles containing ammonium faujasite was prepared by the same procedure as described above. The nominal amount of ammonium faujasite was 34.1% by weight. Various samples of this precursor batch were taken and treated and tested as described and with the results as shown in Table 4.

TABLE 4

| Sample | Pretreat 2 hrs. at 540° C. | | Final heat treat, 4 hrs. in 100 percent steam | | | Nominal faujasite, wt. percent | Surface area, m.²/g. |
|---|---|---|---|---|---|---|---|
| | percent NH₃ | percent H₂O | None | 1,500° F. | 1,550° F. | | |
| 10 | 0 | 100 | x | | | 18.9 | 213 |
| 11 | 5 | 95 | x | | | 19.8 | 212 |
| 12 | 10 | 90 | x | | | 18.6 | 216 |
| 13 | 28 | 72 | x | | | 22.0 | 208 |
| 14 | 50 | 50 | x | | | 17.7 | 195 |
| 15 | 75 | 25 | x | | | 18.0 | 194 |
| 16 | 100 | 0 | x | | | 20.3 | 238 |
| 17 | 0 | 100 | | x | | 11.1 | 79 |
| 18 | 28 | 72 | | x | | 15.3 | 91 |
| 19 | 48.5 | 51.5 | | x | | 14.7 | 80 |
| 20 | 73.8 | 26.2 | | x | | 14.7 | |
| 21 | 0 | 100 | | | x | 6.4 | 36 |
| 22 | 28 | 72 | | | x | 8.0 | 49 |

These data in Table 4 are consistent with that in Table 3 in showing that the nominal amount of faujasite remaining after accelerated aging of the ammoniatively deammoniated samples is higher than of those deammoniated in the absence of ammonia.

Samples 17, 18, 21 and 22 were further tested for activity and stability by means of the CAT-D-1 test which was modified for Samples 17 and 18 in having the space rate increased to 3 instead of the normal 1 space rate. This increase was used to avoid overcracking because of the high activity of the catalyst. All other operations were in accordance with the described CAT-D-1 methods. The results were as follows:

| Sample No. | Vol. percent, gasoline | Wt. percent, coke | Wt. percent, gas | Wt. percent, conversion | Wt. percent, gasoline selectivity |
|---|---|---|---|---|---|
| 17 | 62.7 | 1.2 | 7.5 | 61.7 | 85.8 |
| 18 | 65.5 | 1.2 | 13.2 | 70.3 | 78.7 |
| 21 | 40.4 | 1.8 | 11.0 | 46.9 | 72.0 |
| 22 | 53.4 | 1.3 | 10.0 | 56.4 | 79.8 |

The superiority in activity and stability of Samples 18 and 22 is clearly evidenced in these tabulated results and shows the beneficial effects possible through the ammoniative deammoniation of the invention.

Obviously, many modifications and variations of the invention as herein before set forth may be made without departing from the spirit and scope thereof, and therefore only such limitations should be imposed as are indicated in the appended claims.

I claim:
1. In the method of preparing cracking catalyst, in which there is the preparation of precursor particles comprising an inorganic matrix and faujasite previously ion-exchanged to incorporate a volatile base of the group consisting of ammonia, trimethyl amine and ethylene diamine, and in which said precursor particles are heated at a temperature at which the volatile base evolves as a basic gas and in which such evolution of the basic gas provides cracking catalyst particles comprising hydrogen faujasite in an inorganic matrix, the improvement which consists of:
heating at a temperature carefully controlled to below 590° C. particles comprising faujasite previously ion-exchanged to incorporate said volatile base in a treatment zone characterized by an atmosphere carefully regulated to contain at least 10% but less than 30% by volume added basic gas of the group consisting of ammonia, trimethyl amine and ethylene diamine, and added steam in an amount by volume greater than the amount of added basic gas;
withdrawing said particles from said treatment zone to provide cracking catalyst particles having thermal stability above about 700° C.

2. The method of claim 1 in which the peak temperature for volatilization of the volatile base is about 540° C.

3. The method of claim 1 in which a significant portion of the volatile base in the zone in which the precursor is converted to a stabilized cracking catalyst is recovered for reuse.

4. The method of claim 1 in which said basic gas is ammonia.

References Cited

UNITED STATES PATENTS 3,239,471 3/1966 Chin et al. _____ 252—455
3,404,086 10/1968 Plank et al. _____ 252—455 X DANIEL E. WYMAN, Primary Examiner
C. F. DEES, Assistant Examiner

PO-1050
(5/69)

UNITED STATES PATENT OFFICE
CERTIFICATE OF CORRECTION

Patent No. 3,541,027     Dated November 17, 1970

Inventor(s) Jules S. Lapides

It is certified that error appears in the above-identified patent and that said Letters Patent are hereby corrected as shown below:

Column 5, line 65 "32.3%" should read --32.2%--

Column 5, line 70 "ammonium" should read --ammonia--

Column 5, line 72 spelling of "ammosia" should be --ammonia--

Column 7, line 29 "stream" should read --steam--

Column 7, line 38 "deammoniated" should read --deammoniation--

Column 8, line 52 "Example IV" should read --Example IX--

Column 10, line 28 in Table 3 under heading of Vol.% gaso. "34.5" should read --43.5--

Column 10, line 60 in Table 4 under heading of surface area of Sample 17 "79" should read --70--

Signed and sealed this 15th day of February 1972.

(SEAL)
Attest:

EDWARD M. FLETCHER, JR.
Attesting Officer

ROBERT GOTTSCHALK
Commissioner of Patents